United States Patent [19]
Bartlett

[11] Patent Number: 5,794,923
[45] Date of Patent: Aug. 18, 1998

[54] DRESSAGE ARENA

[76] Inventor: Michelle Bartlett, 16979 9th Line, R.R. #3, Mount Albert, Ontario, Canada, L0G 1M0

[21] Appl. No.: 814,644

[22] Filed: Mar. 10, 1997

[51] Int. Cl.$^6$ ............................................ E04H 17/14
[52] U.S. Cl. .................... 256/64; 256/1; 256/19; 256/59; 256/66; 403/316; 182/153; 182/186
[58] Field of Search ...................... 256/64, 63, 65, 256/66, 59, 19, 1; 403/326, 329, 319, 316; 404/6, 9; 182/153, 186, 225

[56] References Cited

U.S. PATENT DOCUMENTS

| | | | |
|---|---|---|---|
| 1,773,128 | 8/1930 | Barrus | 256/64 |
| 3,089,682 | 5/1963 | Parker | 256/64 |
| 3,917,232 | 11/1975 | Lindner | 256/64 |
| 3,950,873 | 4/1976 | Stehle et al. | 256/64 X |
| 4,071,224 | 1/1978 | Gilbert | 256/64 |
| 4,943,035 | 7/1990 | Thomson et al. | 256/64 |
| 5,402,860 | 4/1995 | Fry | 182/153 X |
| 5,439,073 | 8/1995 | Johnson | 182/182.4 X |
| 5,544,614 | 8/1996 | Cushman | 404/6 X |
| 5,622,444 | 4/1997 | Gronnevik | 403/316 |

OTHER PUBLICATIONS

"A Supplemental Guide For Bloks' Equestrian Products", BLOKS USA, Orinda, CA, 1996 Product Catalog, all pages.
"JUMPVC The World Standard In Jumps", JUMP PVC, Inc. Jackson, MO, 1996 Product Catalog, p. 19.
Silk Tree Manufacturing Co., 1996 Catalog, pp. 2, 4–6, 8 and 10.
Life Time Fence, Sacramento, CA, 1996 Advertisement.
Jumps–R–Us, 1996 Catalog, pp. 15 and one other.

*Primary Examiner*—Daniel P. Stodola
*Assistant Examiner*—Bruce A. Lev
*Attorney, Agent, or Firm*—Barrigar & Moss; Lynn S. Cassan

[57] ABSTRACT

A dressage arena fence module comprising at least two component brackets and at least one component rail. Each bracket comprises a slot to couple the rail to the bracket. Integral with the slot and integral with the rail are cooperating appertures and tabs to releasably lock the rail to the brackets. The fence is an easy to assemble and disassemble modular arena fence system from components which fence may be stacked in sections when assembled. The fence may be anchored to the ground.

17 Claims, 16 Drawing Sheets

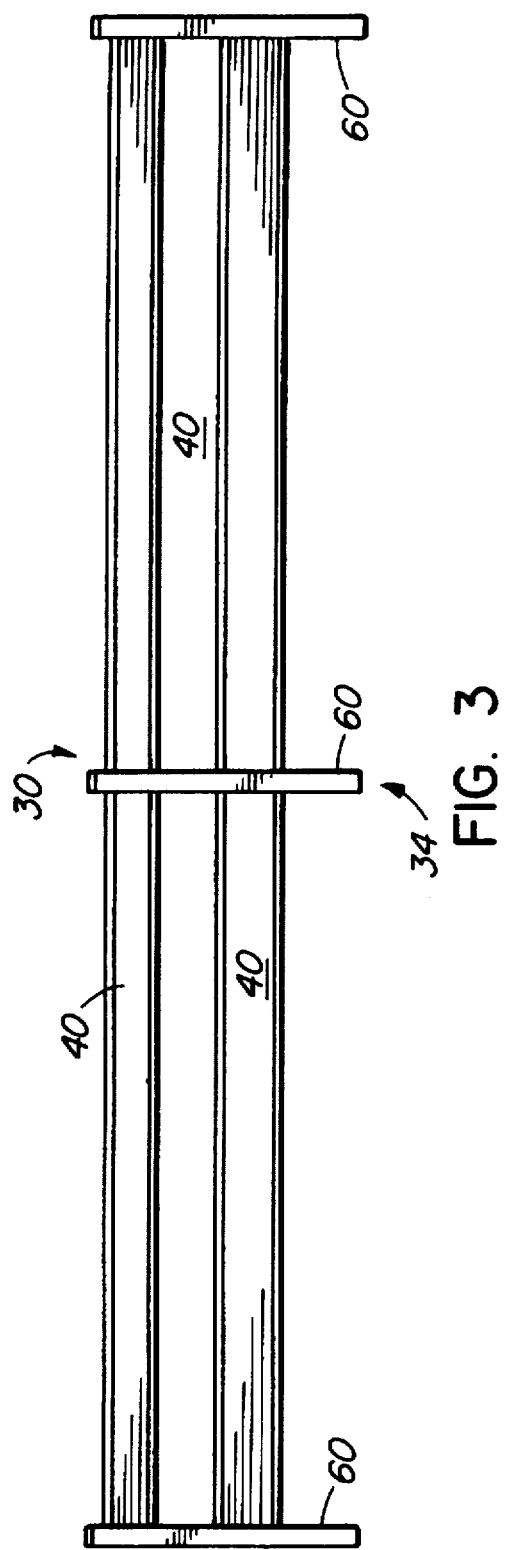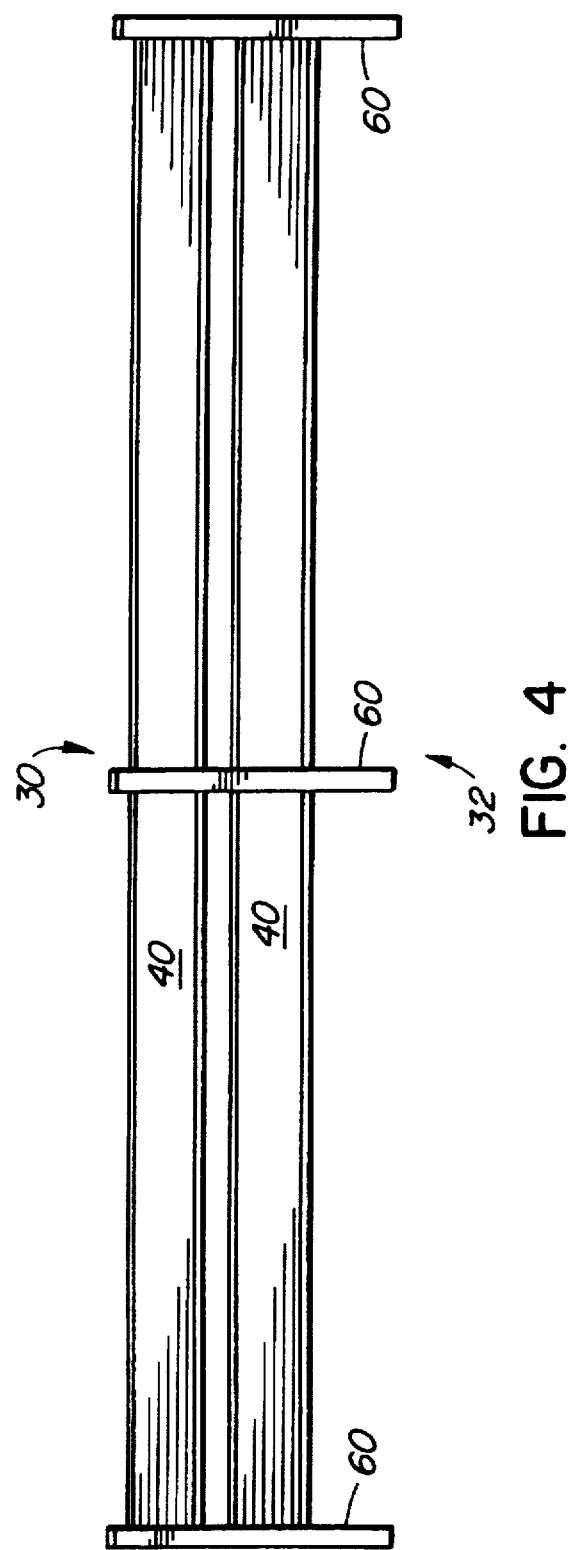

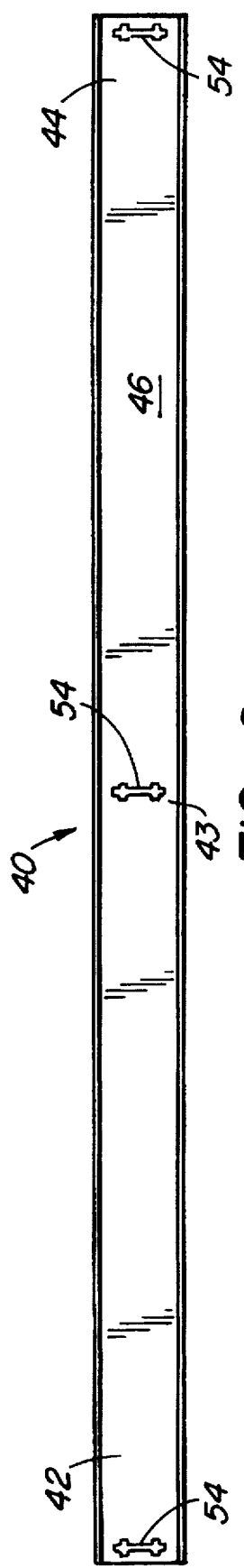
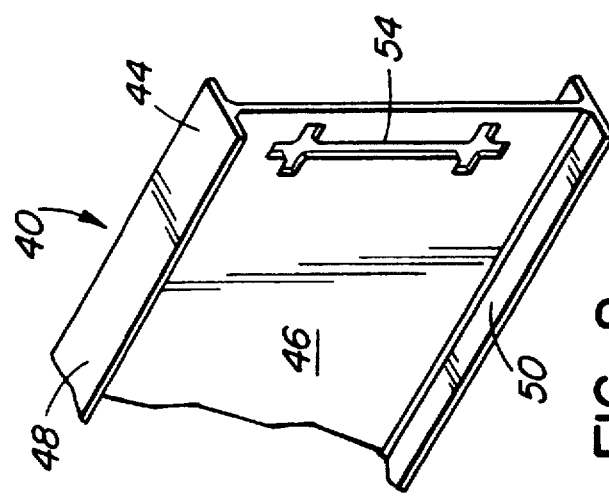
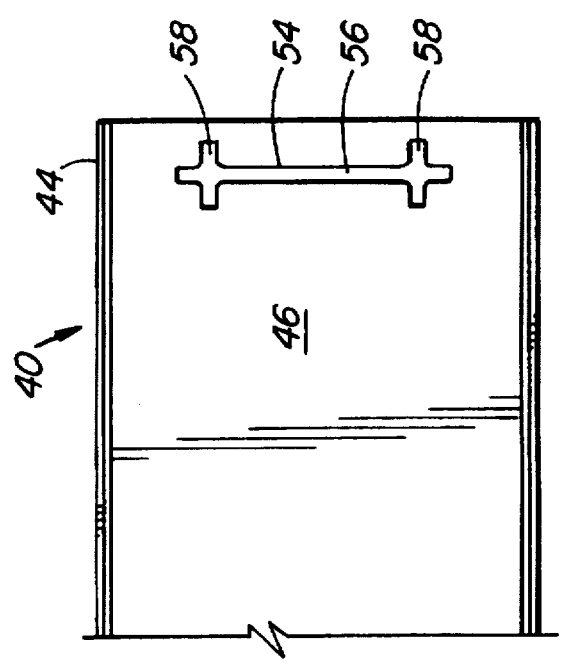
FIG. 6
FIG. 8
FIG. 7

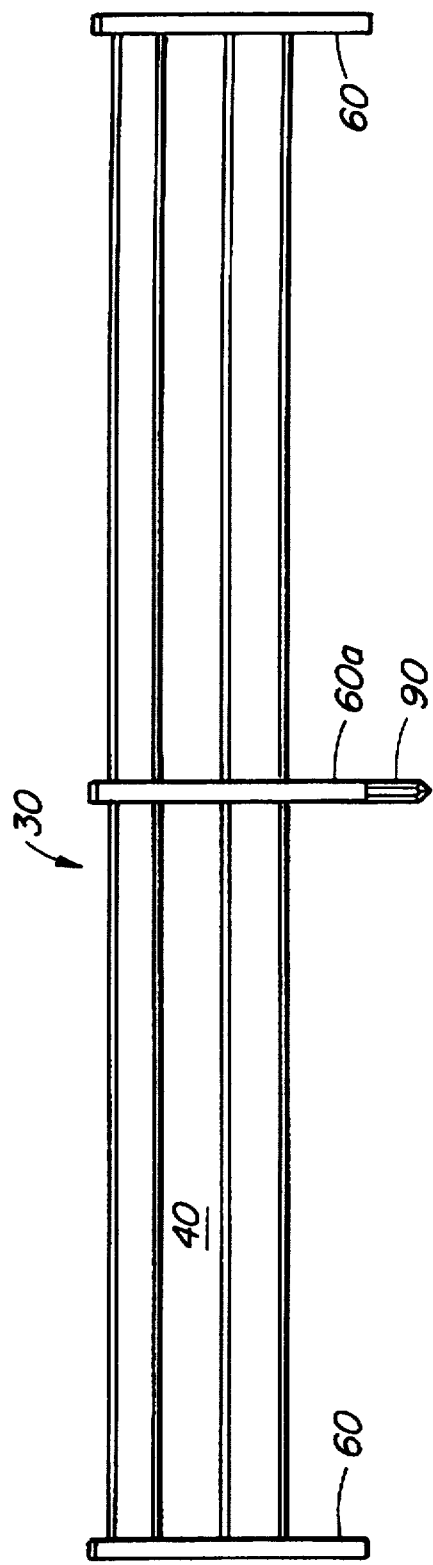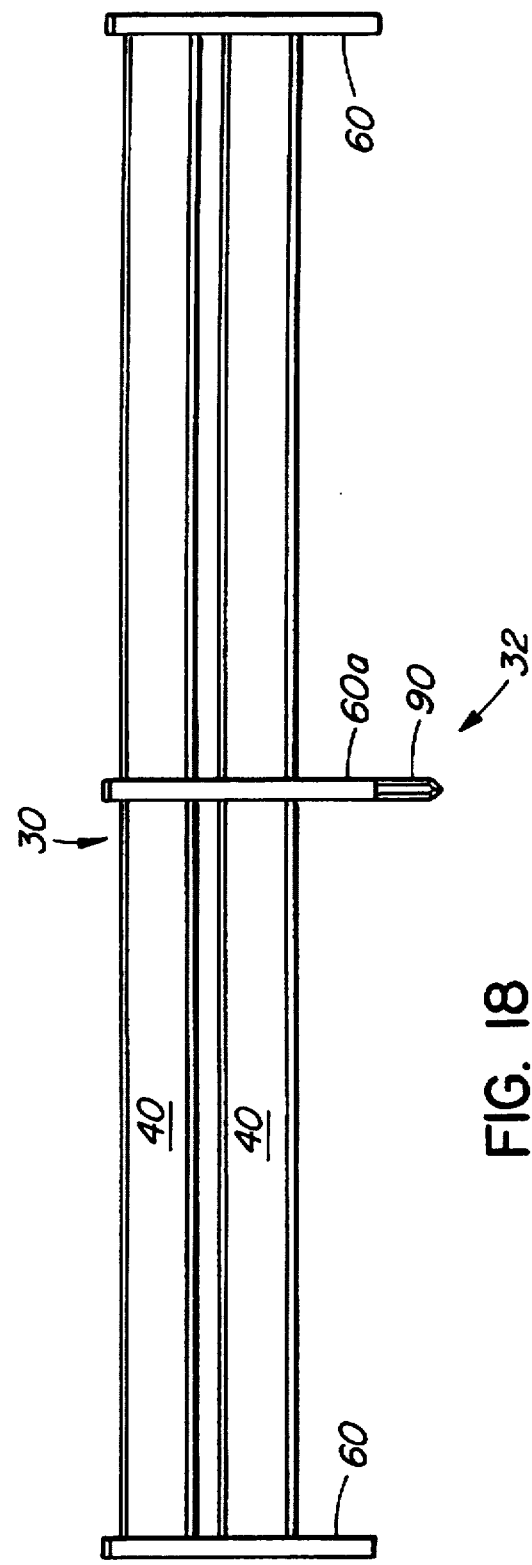

a
DRESSAGE ARENA

FIELD OF THE INVENTION

The invention relates to dressage arenas and more particularly to a modular fence system and components therefor.

BACKGROUND OF THE INVENTION

In the sport of dressage, arena demarcation is necessary to provide a simple boundary to delineate the area of competition or practice in which the rider and horse perform. Such arenas are marked by fencing, about 30 cm in height and enclosing an area of about 20 m by 40 m for a small arena and about 20 m by 60 m for a large arena. It is often necessary to assemble and then disassemble such arenas after a short period of time. It is further desired to be able to stack and thereby conveniently store sections of fencing for such arenas in an assembled state for quick configuration into an arena.

Prior art fencing has comprised simple post and rail or post and chain fencing. In such systems, each post must be driven into the ground to create a support for the rails or chain. When constructed of wood or other painted material, maintenance is a labor intensive chore. Assembly and disassembly is time consuming and not suited for all types of arena grounds.

Alternate rail fencing systems comprise self-supporting brackets such as galvanized steel pipe inverted v-shaped brackets. Such systems require mounting hardware such as screws and/or bolts to attach the rails and are therefore also time consuming to assemble and disassemble.

Also known are free standing pedestals and pylons to support single rails or chains therebetween and pre-constructed sections of post and rail type fencing having folding legs to support each section of fence. Products such as these, if constructed of PVC plastic, may require little maintenance but they are susceptible to wind and other forces which may tend to topple such fences when erected. Furthermore, the preassembled post and rail fencing cannot be completely disassembled for more compact storage such as during transport.

It would therefore be an improvement in the art to provide an easy to assemble and disassemble modular arena fence system constructed from modules which may be stacked in sections when assembled. It would also be advantageous to provide such a system which is convenient to store and transport. It is a further improvement and advantage over the art to provide a modular fence which may be conveniently anchored to the ground.

SUMMARY OF THE INVENTION

The present invention relates to dressage arena fence modules for constructing a dressage arena in which the module is constructed from component parts, namely at least two brackets and at least one rail. Integral with each rail is first locking means. Integral with each of said brackets is rail coupling means for coupling the rail to the brackets. The rail coupling means comprises second locking means which cooperate with the first locking means of each rail for releasably locking the rail to each bracket.

In a preferred embodiment, the rail coupling means comprises slots in the brackets configured for receiving the rail.

The first locking means of the rail comprises notches and the second locking means of each bracket comprises a tab whereby a notch of the rail and a tab of the bracket cooperate to releasably lock the rail to the bracket in a snap fit relationship.

In a preferred embodiment, the rail comprise two notches located near each end of said rail for releasably locking the rail at each end to a bracket.

In a preferred embodiment, the bracket is the shape of an inverted V having two diverging legs. The diverging legs of each V-shaped bracket form an internal apex and external apex whereby two or more fence modules are stackable by nestling the external apices of the brackets of one fence module within the internal apices of the brackets of another fence module.

In a preferred embodiment, the rail in cross-section is I-shaped and the shape of the slots of the brackets is I-shaped and sized for a close fit of the rail through the slots.

The fence module may comprise three rails and three brackets wherein each rail comprises three notches, two of which are located near each end of the rail and a third notch at about the middle thereof for releasably locking the rail to a bracket at the middle of the rail. Each bracket comprises two slots on one leg and one slot on the other leg.

The fence module may further comprises a bracket having a ground anchor for insertion into the ground. The ground anchor comprises a wedge integral with and extending from and substantially planer to one of the legs of the bracket.

The present invention also relates to a set of interlocking components of a dressage arena, a first component being a bracket and a second component being a rail. Integral with the rail is first locking means. Integral with the bracket is rail coupling means for coupling the rail to the brackets and integral therewith is second locking means which cooperate with the first locking means for releasably locking the rail to the bracket.

In a preferred set of components, the rail coupling means comprises a slot configured for receiving therethrough the rail. The first locking means of the rail comprises a notch and the second locking means of the bracket comprises a tab whereby the notch of the rail and the tab of the bracket cooperate to releasably lock the rail to the bracket in a snap fit relationship.

In a preferred embodiment, the rail comprises a notches located near each end of said rail for releasably locking the rail at each end thereof to a bracket. The bracket is the shape of an inverted V having two diverging legs. The rail in cross-section is I-shaped and the shape of the slot of the bracket is I-shaped and sized for a close fit of the rail through the slot.

In a further preferred embodiment of the set of components, the rail comprises a third notch located at about the middle thereof for releasably locking the rail to a bracket at the middle of the rail. The bracket comprises two slots on one of its legs and one slot on the other leg.

Therefore, the present invention seeks to provide an easy to assemble and disassemble modular arena fence system from components which fence may be stacked in sections when assembled. A further object of the invention is a system which is convenient to store and transport. It is further object of another embodiment of the present invention to provide a fence which may be anchored to the ground.

BRIEF DESCRIPTION OF THE DRAWINGS

FIG. 3 is a back view of the embodiment of FIG. 1;

FIG. 4 is a front view of the embodiment of FIG. 1;

FIG. 6 is a front view of a preferred rail component of the present invention;

FIG. 7 is an enlarged detail view the right end of the rail of FIG. 6;

FIG. 8 is an enlarged detail perspective view of the right end of the rail of FIG. 6;

FIG. 17 is a back view of the embodiment of FIG. 15;

FIG. 18 is a front view of the embodiment of FIG. 15;

DETAILED DESCRIPTION OF THE INVENTION

Figure 1:
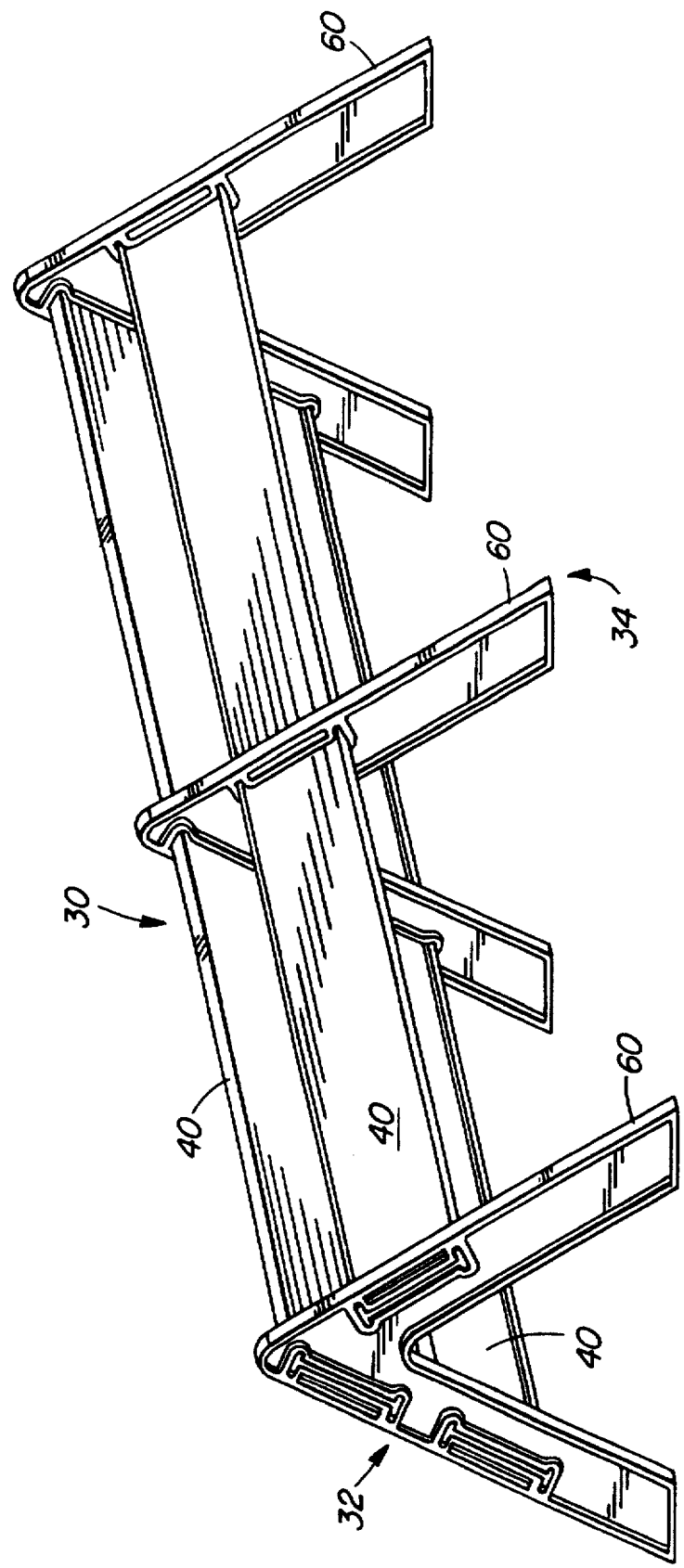
FIG. 1 is a back side perspective view of a preferred embodiment of the present invention.
Figure 2:
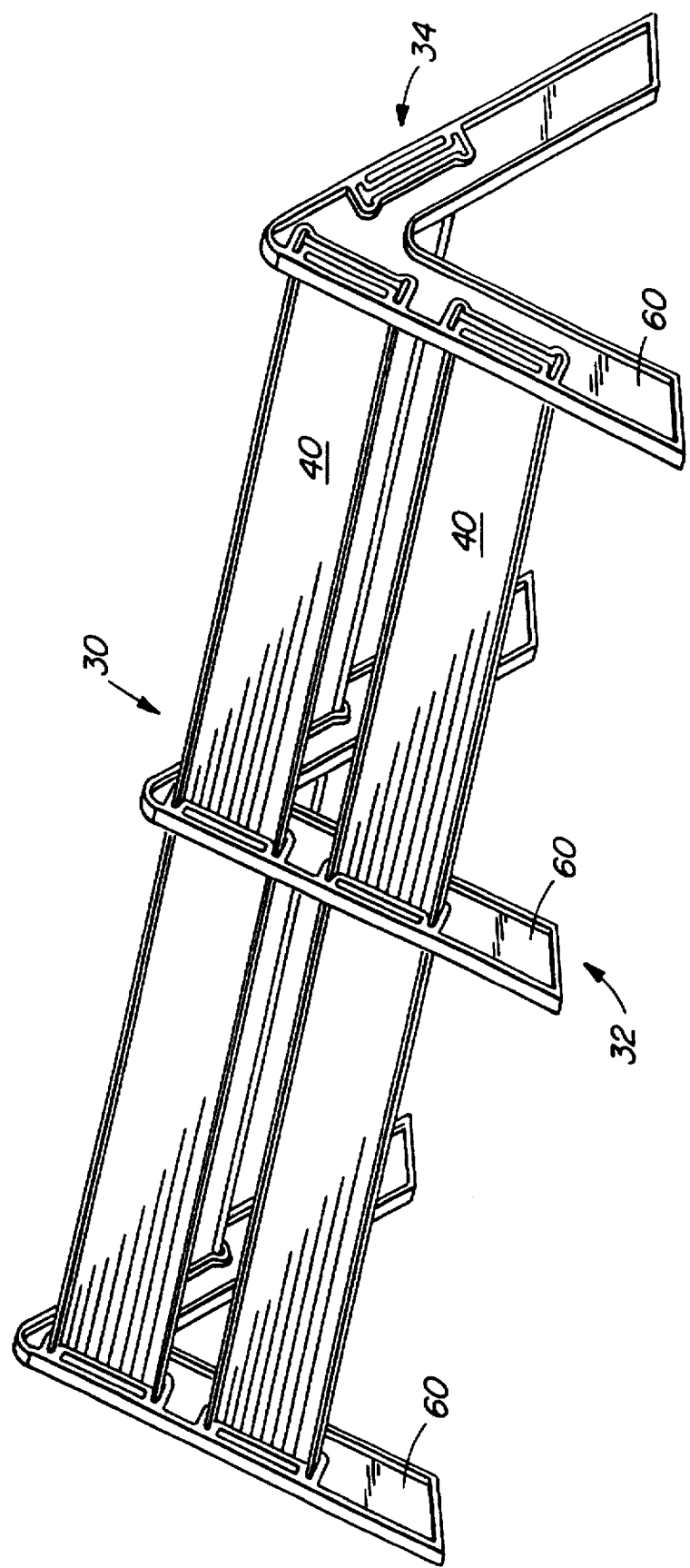
FIG. 2 is a front side perspective view of the embodiment of FIG. 1.
Figure 5:
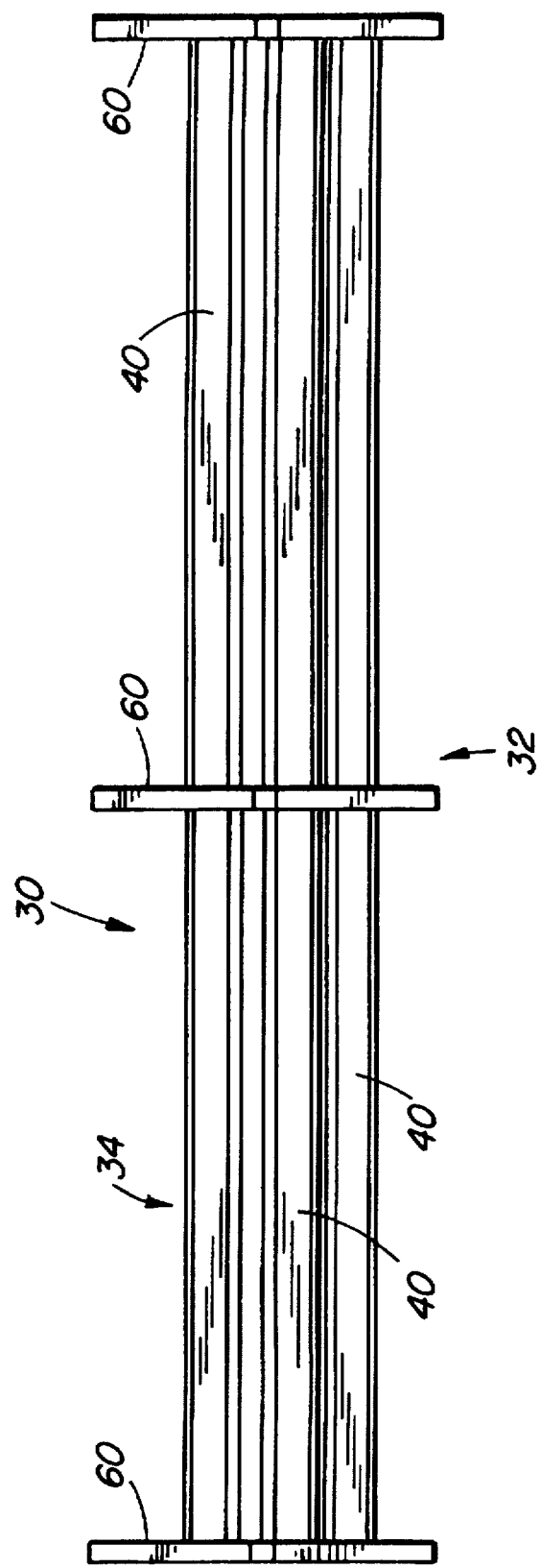
FIG. 5 is a top view of the embodiment of FIG. 1.

Referring more specifically to FIGS. 1-5 of the drawings, the numeral 30 designates generally a preferred embodiment of a dressage arena fence module or section of the present invention. The straight length fence section 30 constructed from components comprises generally three component brackets 60, and three component rails 40. Two rails are located on the front side 32 and one on the back side 34 of the module. The brackets are evenly spaced along the rails.

Figure 9:
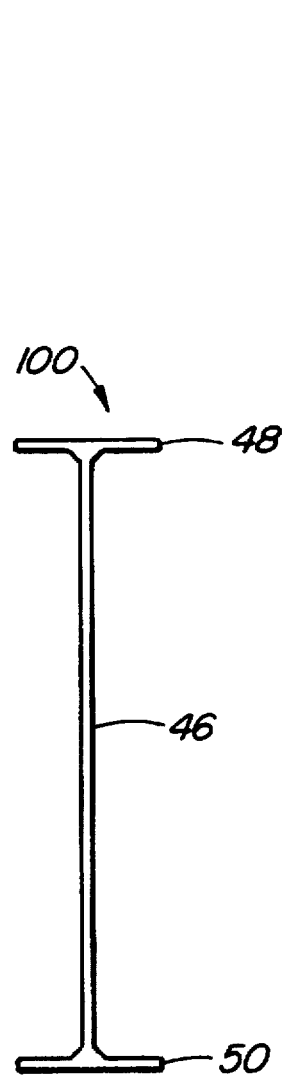
FIG. 9 is an end view of the rail of FIG. 6.
Figure 10:
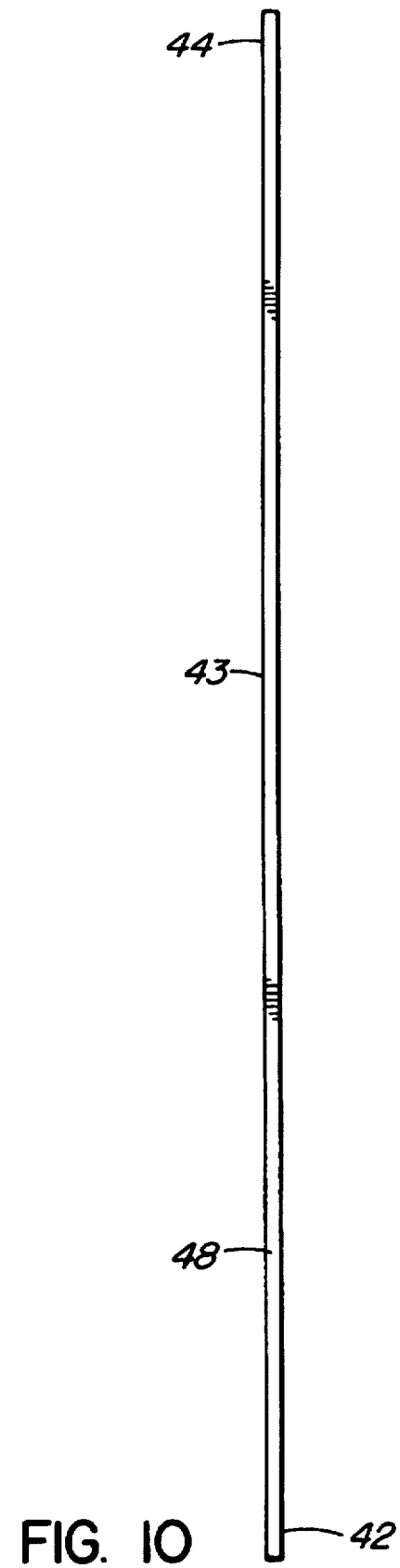
FIG. 10 is a top view of the rail of FIG. 6.
Figure 11:
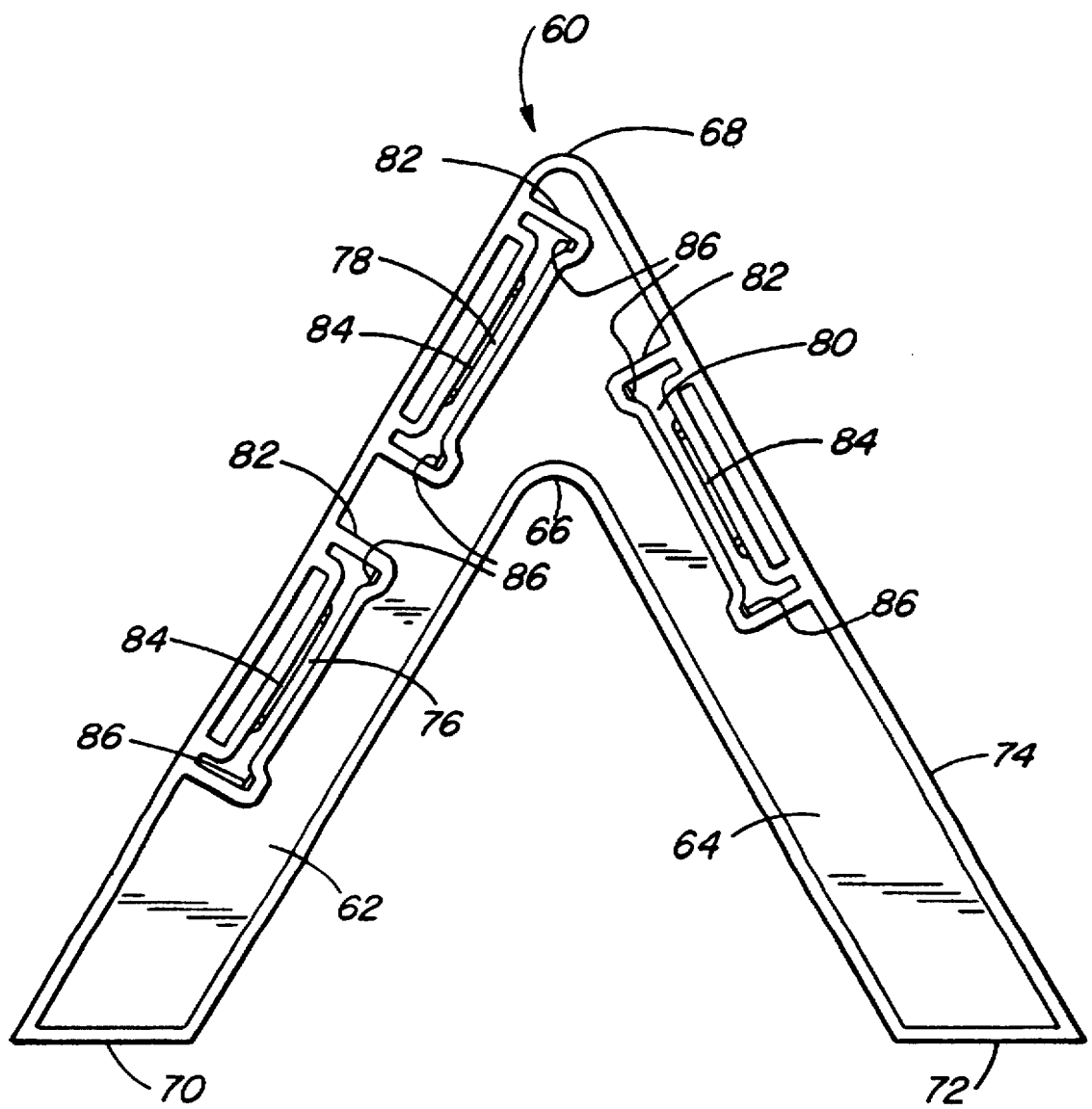
FIG. 11 is a back view of a preferred bracket component of the present invention.
Figure 12:
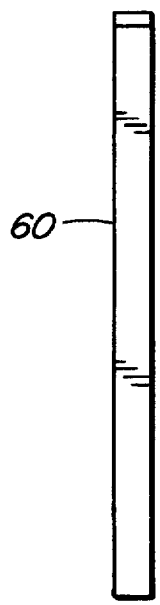
FIG. 12 is a side view of the bracket of FIG. 11.
Figure 20:
FIG. 20 is a side view of the bracket of FIG. 19.
Figure 13:
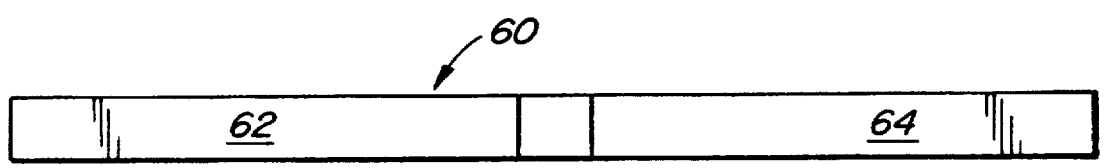
FIG. 13 is a top view of the bracket of FIG. 11.

With reference to FIGS. 6-10, component rail 40 has opposite ends 42 and 44. In transverse cross-section throughout, and as best seen in FIG. 9, the rail is of an I-beam type construction having a side wall 46 and opposite walls 48 and 50 substantially perpendicular to the side wall along the nominal top and bottom edges of the side wall. Formed within and through side wall 46 near ends 42 and 44 and at substantially the midpoint 43 therebetween are notches 54. As seen in FIG. 7, the notches each have a vertical portion 56 and a shorter perpendicular portion 58 near each of the two ends of the vertical portion.

Rail 40 is constructed of moulded PVC plastic in a manner well known to those skilled in the art of PVC product construction and each is typically about 2 m in length and 10 cm in height. Each side wall 46 is about 2 mm in thickness to provide a light weight, flexible but strong rail. In an alternate embodiment, not shown, rail 40 is 1 m in length and notch 54 is omitted at midpoint 53.

With reference to FIGS. 11-14, each component bracket 60 comprises two diverging legs, namely front leg 62 and back leg 64 to form an inverted V-shaped bracket having an interior apex 66 and an exterior apex 68. Each of the legs 62 and 64 has a free end 70 and 72, respectively, cropped so as to be substantially horizontal, for standing the bracket upright when placed on substantially flat arena ground. Each bracket further comprises a peripheral flange 74 therearound to provide structural stability to the bracket and a wider surface at free ends 70 and 72 on which to stand the bracket upright. The interior angle between each leg 62 and 64 is about 45° so as to provide the bracket with sufficiently spaced free ends 70 and 72 to ensure a stable free-standing bracket.

Component brackets 60 are also constructed of moulded PVC plastic and the walls of which are about 5 mm, about 2.5 to 3 times thicker than the walls of the rails. The exterior apex stands about 35 cm from ground level.

Slots 76 and 78 in front leg 62 and slot 80 in back leg 64, are formed within and through the legs of the bracket. The slots have a size and shape which corresponds to the transverse cross-sectional size and shape of the rail 40 to allow the rails to pass therethrough. At the edge of the leg about each of the slots is formed a peripheral flange 82 surrounding the slot to provide enhanced rigidity to the legs and ensure tight engagement between the rail and bracket 60 as more particularly described below.

The slots are formed in the legs adjacent the exterior periphery of the bracket 60, near flange 74. Two slots are formed in the front leg, one higher than the other, and a third slot is formed in the back leg at a height between the heights of the other two slots.

The positioning of the slots near flange 74 provides enhanced structural stability and, when the rails are engaged, an aesthetically pleasing post and rail type fence facing.

Figure 14:
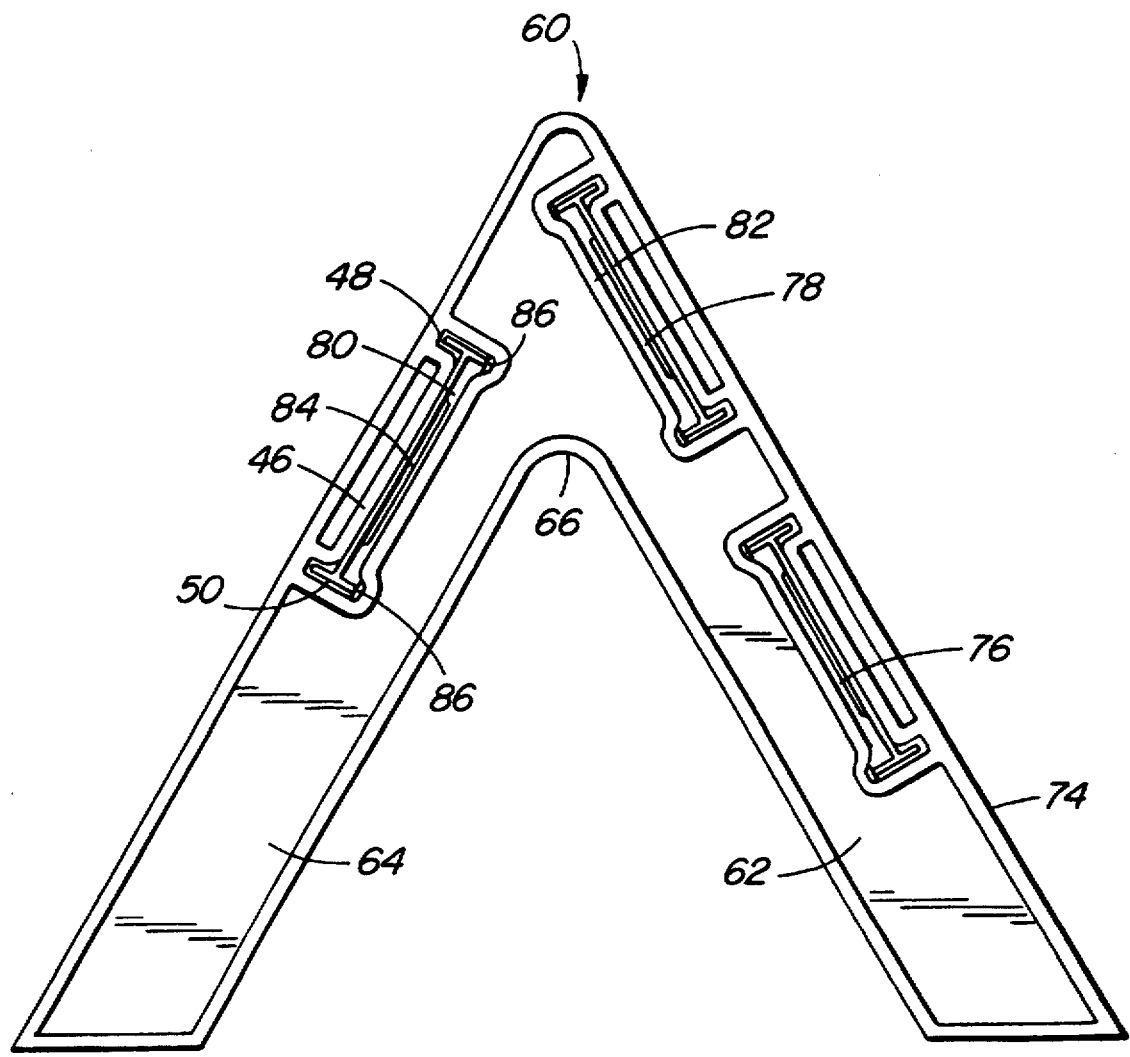
FIG. 14 is a front view of the bracket of FIG. 11.

Locking tabs 84 are located along slot flanges 82, protruding into the slot to meet wall 46 of a rail 40 as further described hereinafter. Additional tabs 86, also located along slot flange 82, protrude into each slot in an opposite direction to locking tabs 84 to provide additional pressure against rail walls 48 and 50 as shown in FIG. 14.

Each slot provides rail coupling means to couple a rail to the bracket while the tabs integral with the legs cooperate in pairings with the notches in each rail to provide releasable snap fit locking means to maintain the rail in place. The meaning of "coupling" and "rail coupling means" herein includes means supporting or attaching a rail to a bracket. While the slot configuration and locking tabs and notch pairings configuration are each preferred embodiments, other configurations may be envisioned by those skilled in the art. Alternatives to slots include rail engaging channels or grooves formed transversely within the edges of the legs of the brackets. Moreover, other tabs and notch pairings or similar locking configurations are also contemplated by the present invention and would be apparent to persons skilled in the art. For example, the tabs may be integral with the rail and notches or other depressions may be formed in the bracket.

In a further preferred embodiment of the invention, as depicted in FIGS. 15-21, an alternate component bracket 60a is shown further comprising a ground anchor 90 in the form of a wedge integral with back leg 64. Anchor 90 protrudes from peripheral flange 74 at the end 72 of leg 64 substantially planar to the leg so as not to interfere with the stacking of fence modules as described below. The anchor has an interior facing edge 92 and an exterior facing edge 94 having a peripheral flange 95. Edge 92 of the anchor is substantially parallel to the longitudinal direction of the leg to also assist in stacking. Edge 94 is substantially perpendicular to the face of free end 72 such that edges 92 and 94 meet at a pointed tip 96 for easy insertion of the anchor into the ground during installation as described further below.

Figure 22:
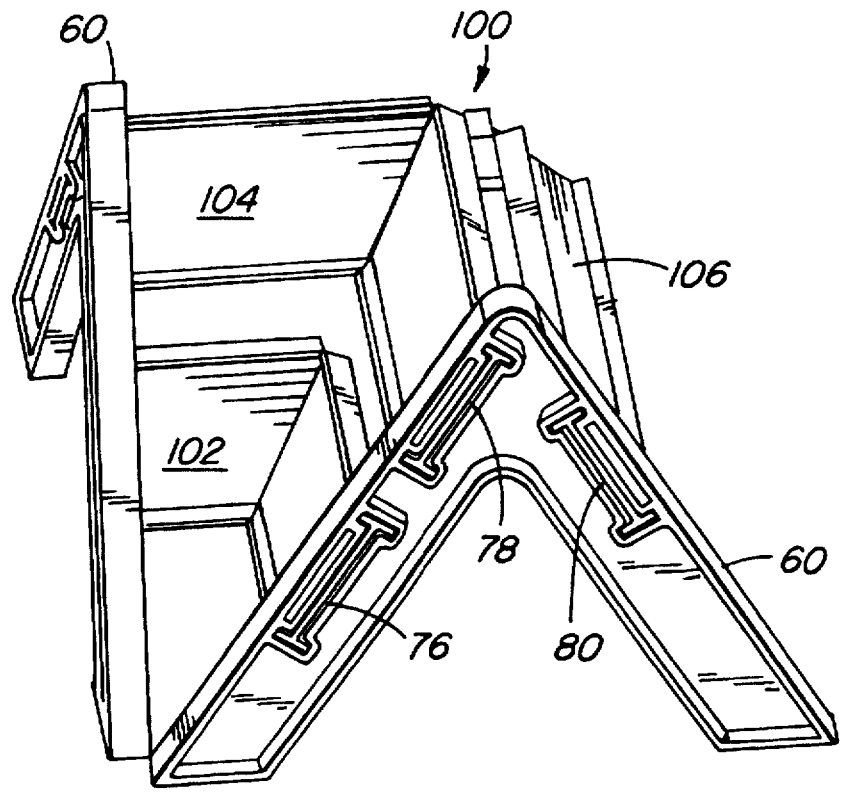
FIG. 22. is a back side perspective view of a second alternate preferred embodiment of the present invention.
Figure 23:
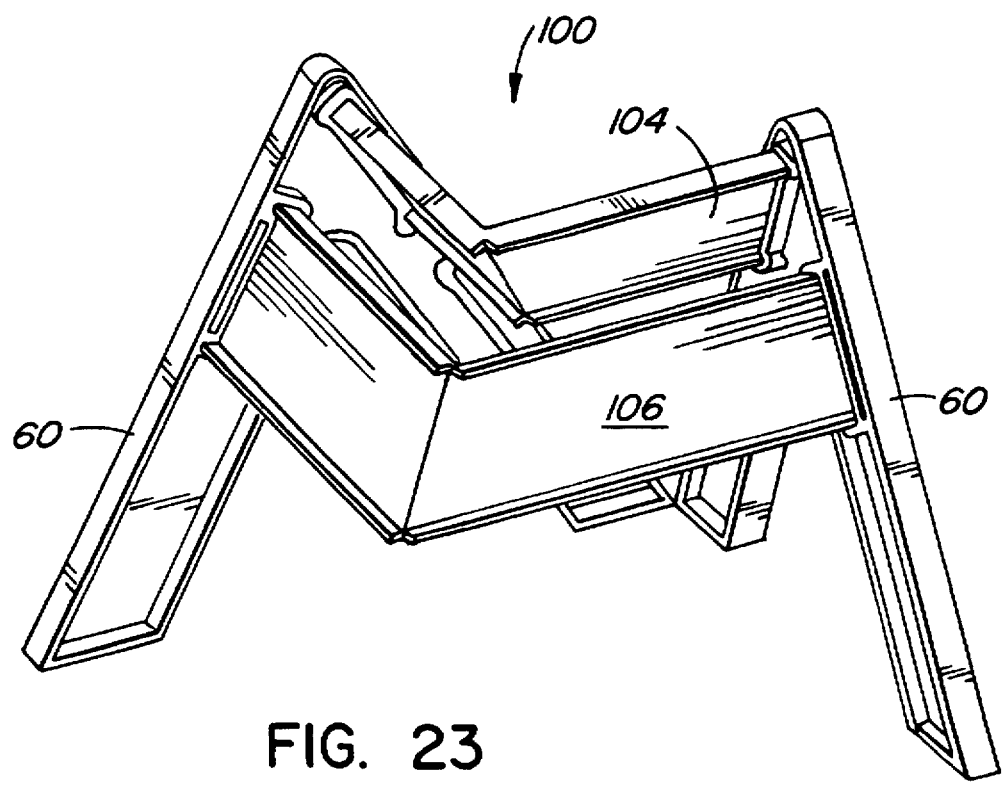
FIG. 23 is a front side perspective view of the embodiment of FIG. 22.

A further preferred fence module, namely corner 100 is depicted in FIGS. 22 and 23. Corner 100 comprises component brackets 60, as previously described, coupling alternate component rails 102, 104 and 106. Rails 102, 104 and 106 are similar to rail 40 in construction, including having notches 54 at each of their respective ends; however, the corner rails are angled at their respective midpoints, to turn a 90° corner and thus have no midpoint notch 54 as may be found in the 2 m embodiment of rail 40 described above. Moreover, as the distance around the corner between each end bracket 60 measured between respective slots 76, 78 and 80 of each bracket in the corner module is different, the length of each rail 102, 104 and 106 is respectively different. In the preferred embodiment of the corner module 100, to match with 2 m length modules 30, rails 102, 104 and 106 are respectively preferably 2.1266 m, 2.202 m and 2.2956 m in length.

Component brackets of the present invention may also be constructed in forms other than the inverted V shape of the preferred embodiment. For example, a self-supporting pylon like bracket or hollow post bracket may be used. Such a bracket may have an open bottom with an integral flange base extending partially therearound, a narrower closed top and slots formed transversely through the pylon or post shaft to couple the rails and permit stacking of constructed fence modules.

It is further understood that other brackets may be constructed in a like manner as described herein to accommodate a different number of rails or rails of a different size or shape. Such rails may be box-like two-by-fours or pipe-like rails.

To construct fence module 30 as seen in FIG. 1, a component rail 40 is inserted in one of slots 76, 78 and 80 in a first component bracket 60. The rail is pushed through a slot until locking tab 84 of the slot aligns with and snaps into notch 54 at midpoint 53 of the rail. As the slots and tabs are dimensioned to provide a snug friction fit against the rails, opposite walls 48 and 50 of rail 40 may be urged toward one another to slightly flex the rail away from locking tab 84, to allow the surface of side wall 46 and notch 54 at the end of the rail to travel over the locking tabs or to assist in releasing the rail from the notch once locked in place.

Figure 21:
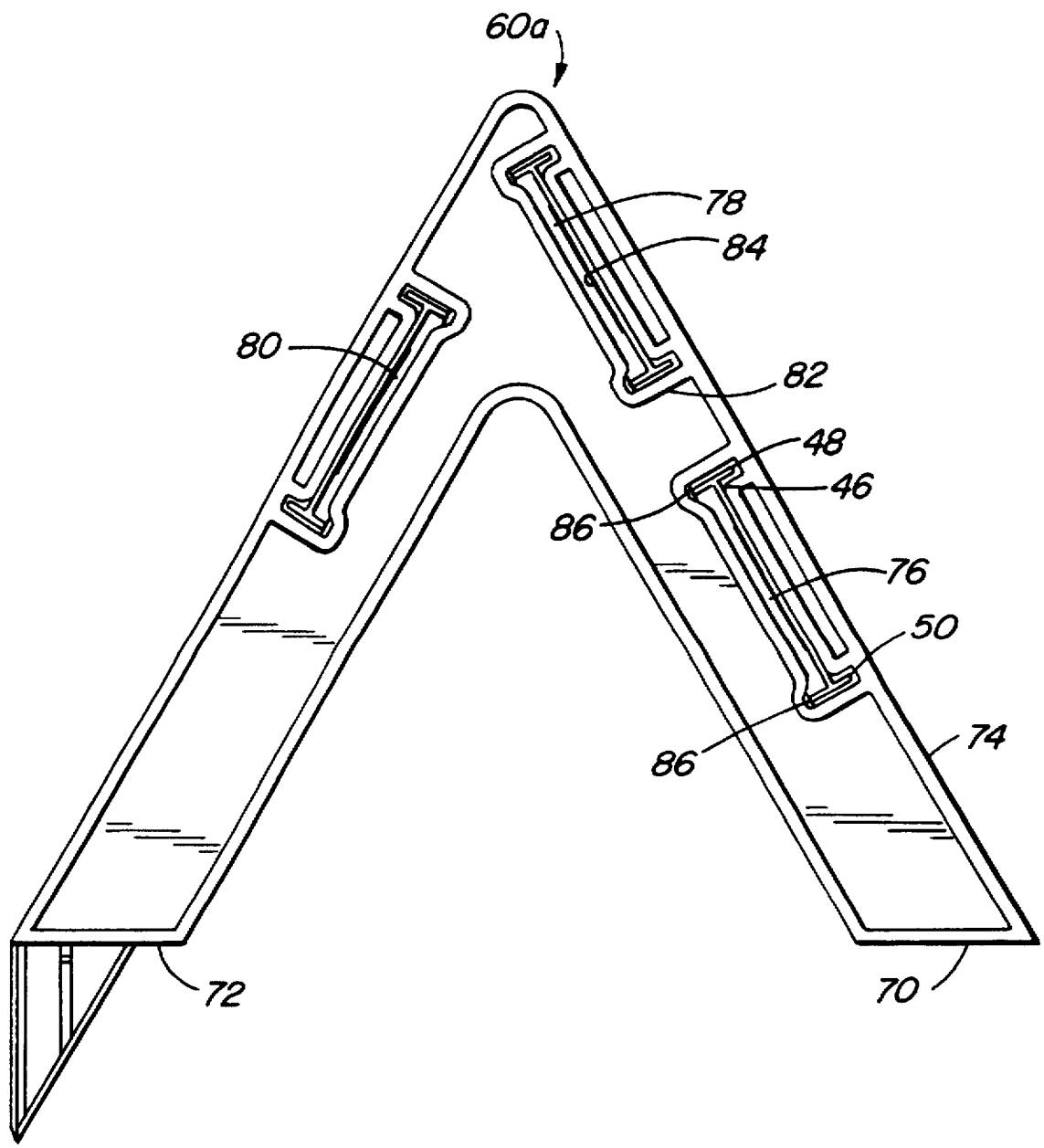
FIG. 21 is a front view of the bracket component of Figure 19.

The above insertion steps are repeated for the remaining two rails. Once the middle bracket is in place, the two remaining brackets 60 may be similarly snap fit around each respective end of the rails, aligning locking tabs 84 with notches 54. As seen in FIGS. 14 and 21, tabs 86 press against the edge sides of walls 48 and 50 of the rail to urge side wall 46 of the rail against the slot flange 82 about the area of the locking tab 84.

Figure 15:
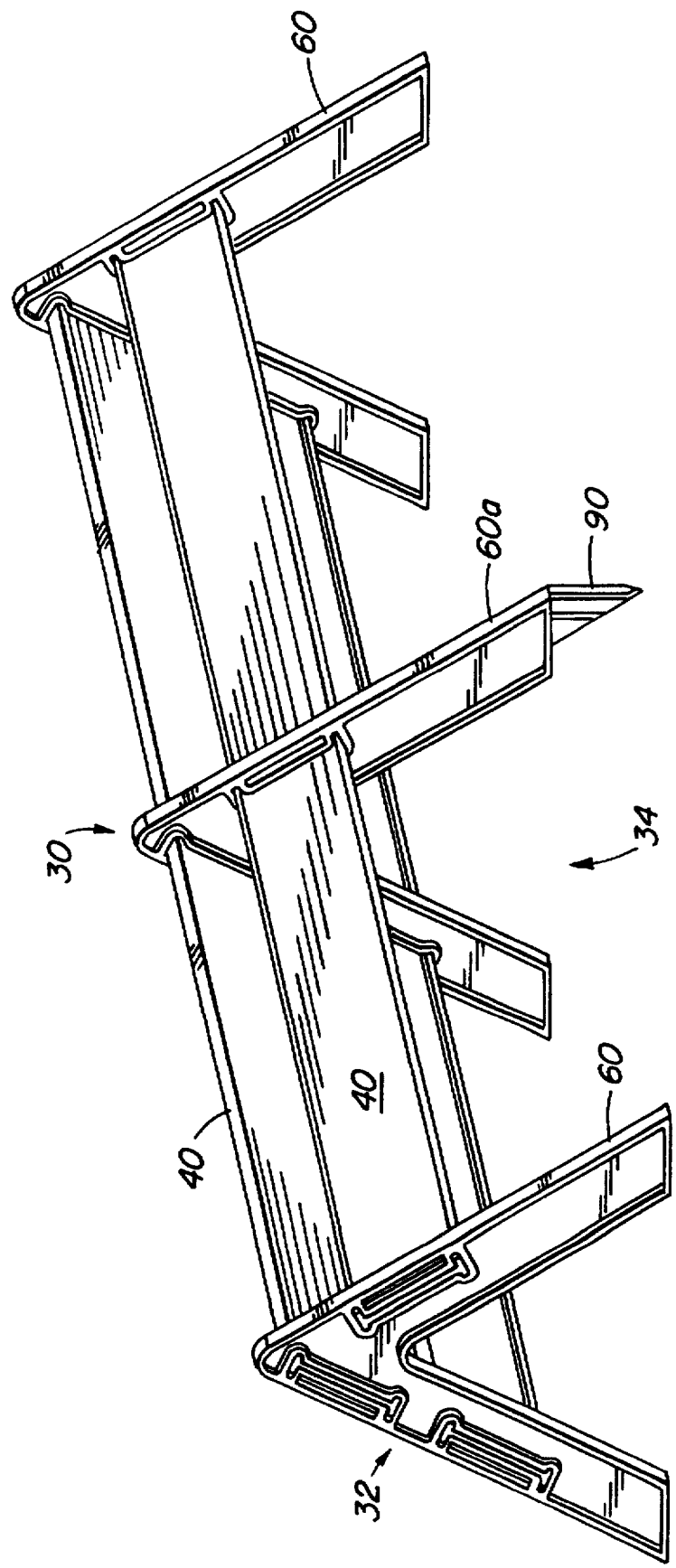
FIG. 15 is a back side perspective view of an alternate preferred embodiment of the present invention.
Figure 16:
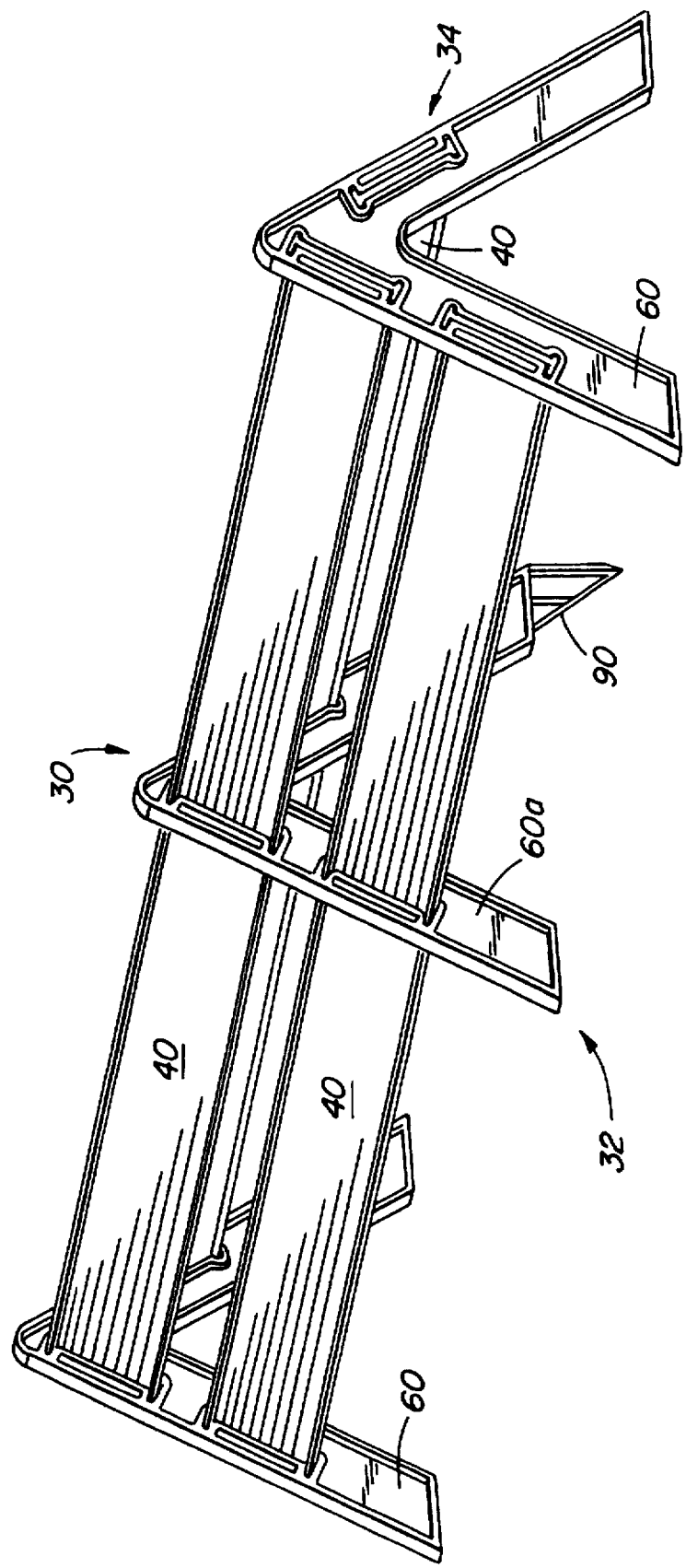
FIG. 16 is a front side perspective view of the embodiment of FIG. 15.
Figure 19:
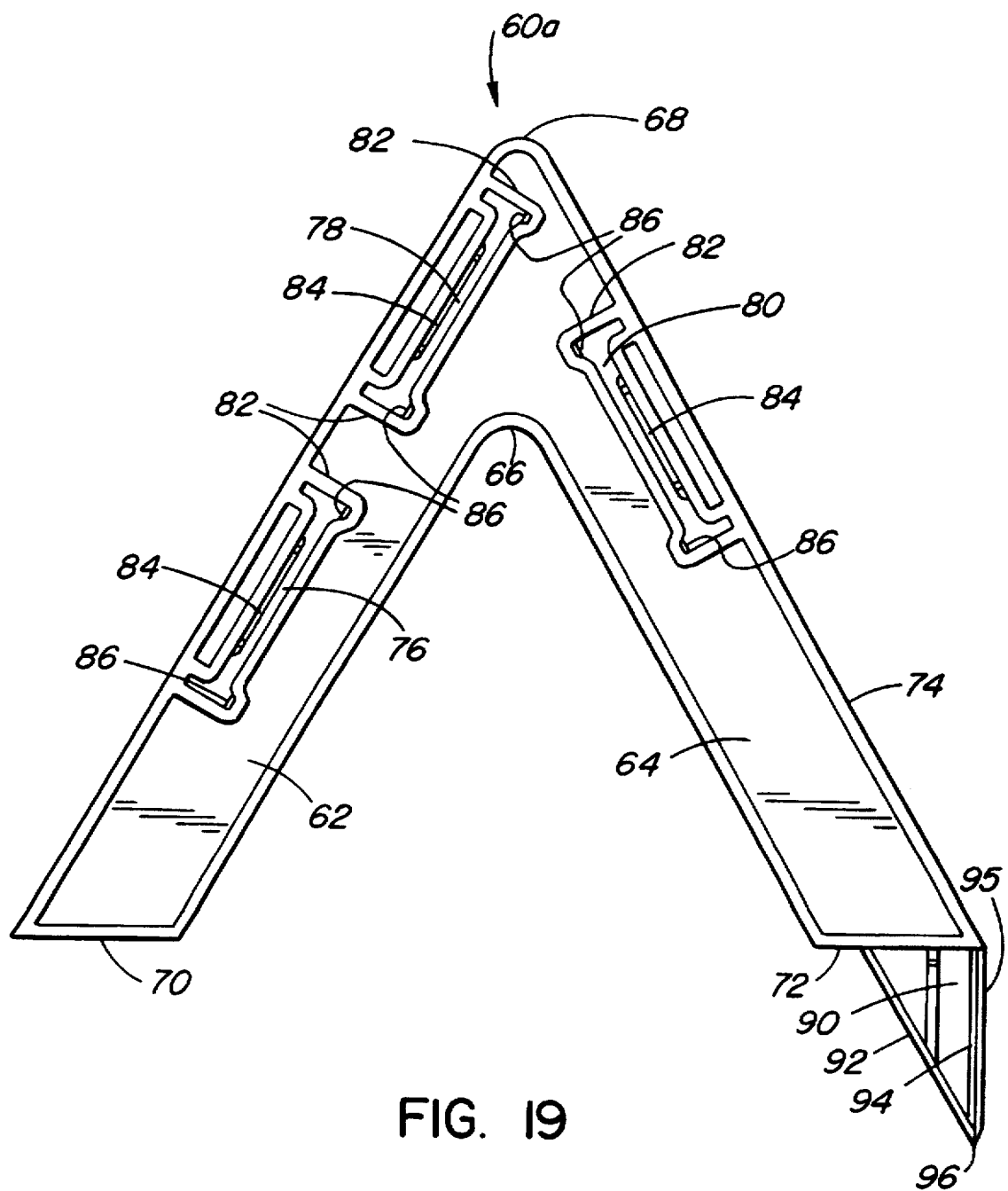
FIG. 19 is a back view of an alternate preferred bracket component of the present invention.

As seen in FIG. 15, alternative bracket 60a having ground anchor 90 is preferably mounted at midpoint 53 but may be mounted on both ends of fence module 30. This latter installation is necessary in the alternate shorter 1 m rail embodiment, previously discussed above but not shown, wherein notch 54 is omitted from midpoint 53 of the rail.

To construct corner module 100, the ends of component rails 102, 104 and 106 are mated with slots 76, 78 and 80 respectively of each component end bracket 60 and snap fit together as per the construction of module 30 described above. Ground anchor brackets 60a are typically not required for corner modules.

To set up an arena using the modules heretofore described, an arena area is determined, for example 20 m×40 m or 20 m×60 m, and the corners thereof located on the arena ground. Corner modules 100 are then placed at each corner of the arena. Straight length sections 30 are then placed in straight lines between the corners, about the periphery of the arena, as follows. For either a 20 m×40 m or a 20 m×60 m arena, one shorter 20 m end preferably consists of eight 2 m fence sections. The other shorter end preferably should have two 1 m sections next to the corners, with seven 2 m sections therebetween. The 2 m section in the middle of this end may then act as the gate to the arena and preferably will be constructed without a ground anchor bracket 60a to assist in frequent replacement of the gate between riders. The sides of a 40 m arena may comprise eighteen 2 m sections each while a 60 m arena may comprise 28 2 m sections each.

To place a fence section 30 having a ground anchor bracket 60a in the ground, the installer stands facing ground anchor 90, i.e. on back side 34 of the fence section, and positions the section just above the ground so that only anchor tip 96 touches the ground surface. Fence section 30 is then tilted slightly backward toward the installer. The ball of the installer's foot should then be placed over the anchor flange 95 of edge 94 and pressure applied to the fence section in a downward direction. The resulting motion will push the anchor into the ground and the fence should rotate forward, away from the installer, and into the correct position.

Figure 24:
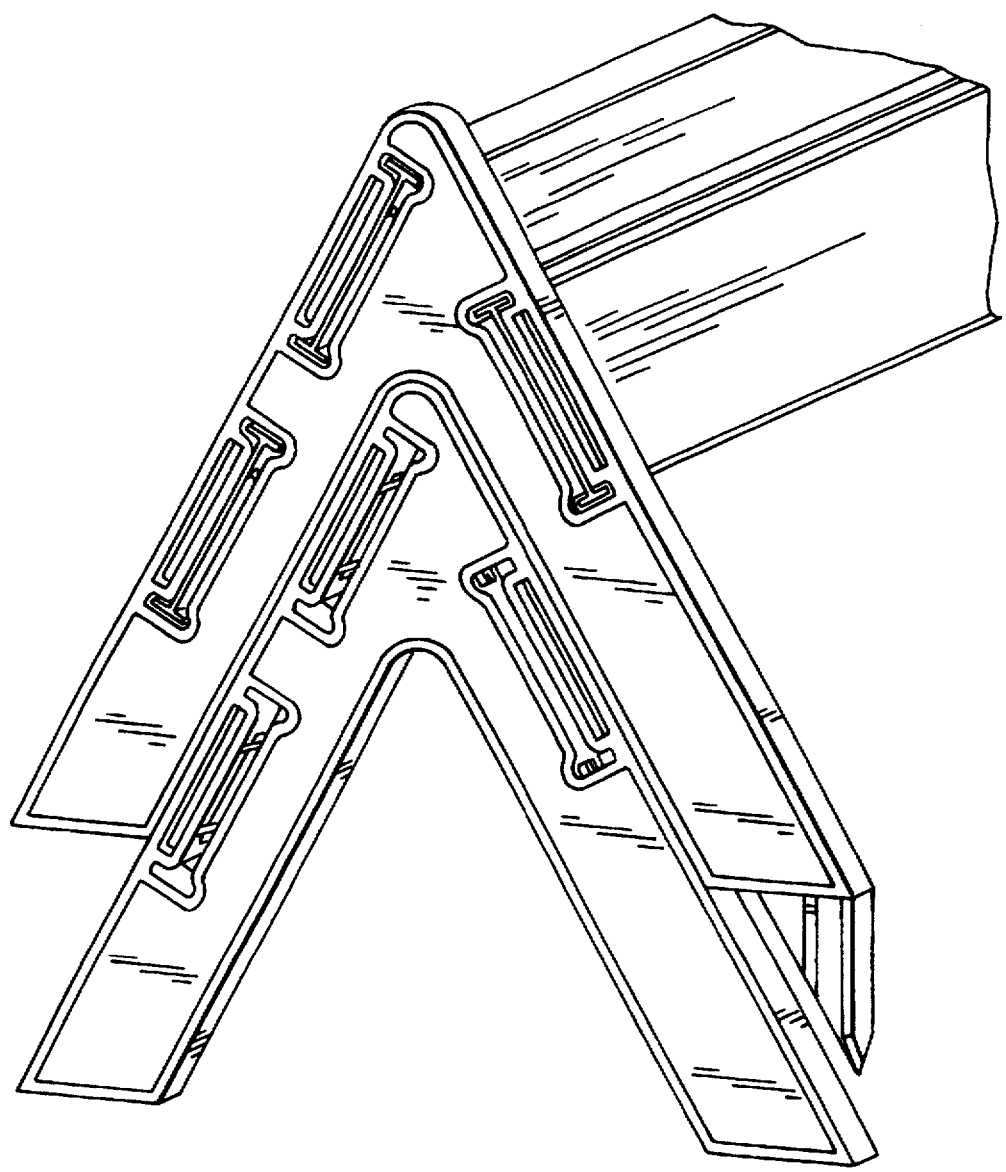
FIG. 24 is a back side sectional perspective view of two embodiments of the present invention in stacked relationship.

Modules 30 constructed according to the present invention, having brackets 60 or 60a or both, may be stacked one on top of the other, with exterior apex 68 of a lower module nestled against interior apex 66 of a module on top as seen in FIG. 24. As each module is a self-supporting unit when assembled, such a stacking ability permits quick disassembly and reassembly of an arena.

Fence modules constructed from components according to the present invention are low maintenance and may be cleaned with water and/or a mild detergent to keep them in good, "like-new" condition.

What is claimed is:

1. A dressage arena fence module comprising:
 (a) at least two brackets;
 (b) at least one rail comprising first locking means integral therewith, said first locking means comprising at least two apertures formed through said rail, spaced from the periphery of said rail, wherein said apertures are of a preselected size and shape; and,
 (c) rail coupling means integral with said brackets for coupling said rail to said brackets and comprising second locking means cooperating with said first locking means for releasably locking said rail to said brackets, said second locking means of said bracket comprising at least one tab of a preselected size and shape corresponding to said aperture of said rail whereby at least one tab of said bracket is insertable into and removeable from at least one aperture of said rail such that said at least one tab is frictionally engaged within said at least one aperture in a mating snap fit relationship to releasably lock said rail to said bracket.

2. A fence module according to claim 1 wherein said rail coupling means comprises slots in said brackets configured for receiving said rail.

3. A fence module according to claim 2 wherein said rail in cross-section is I-shaped and resiliently flexible from top to bottom of the rail and the shape of said slots of said brackets is I-shaped and sized for a close fit of said rail through said slots whereby to insert the rail into the slots, the rail is flexed from top to bottom to slide the rail over at least one tab of the bracket until the at least one aperture of the rail is positioned adjacent the at least one tab whereupon the flexion of the rail may be released to mate the at least one tab with the at least one aperture.

4. A fence module according to claim 2 wherein said rail comprises an aperture located near each end of said rail for releasably locking said rail at each end thereof to a bracket.

5. A fence module according to claim 4 wherein said bracket is the shape of an inverted V having two diverging legs.

6. A fence module according to claim 5 wherein said diverging legs of said bracket form an internal apex and external apex whereby two or more of said fence modules are stackable by nestling the external apices of the brackets of one said fence module within the internal apices of the brackets of another of said fence modules such that, when stacked, the diverging legs of an upper bracket are supported by the diverging legs of an adjacent lower bracket to provide a stable stack of fence modules.

7. A fence module according to claim 6 wherein said rail in cross-section is I-shaped and resiliently flexible from top to bottom of the rail and the shape of said slots of said brackets is I-shaped and sized for a close fit of said rail through said slots whereby to insert the rail into the slots, the rail is flexed from top to bottom to slide the rail over the at least one tab of the bracket until the at least one aperture of the rail is positioned adjacent the at least one tab whereupon the flexion of the rail may be released to mate the at least one tab with the at least one aperture.

8. A fence module according to claim 7 comprising three said rails and three said brackets wherein each said rail comprises a middle between each of said ends of the rail and a third aperture located at about the middle of said rail for releasably locking said rail to a bracket at the middle of said rail and each said bracket comprises two slots on one leg thereof and one slot on the other leg thereof.

9. A fence module according to claim 8 wherein at least one said bracket comprises an integral ground anchor for insertion into the ground.

10. A fence module according to claim 9 wherein said ground anchor comprises a wedge integral with and extending from and substantially planer to one of the legs of said bracket.

11. A fence module according to claim 4 comprising three said rails and three said brackets wherein each said rail comprises a middle between each of said ends of the rail and a third aperture located at about the middle of said rail for releasably locking said rail to a bracket at the middle of said rail and each said bracket comprises two slots on one leg thereof and one slot on the other leg thereof.

12. A set of interlocking components of a dressage arena, a first of said components being a bracket and a second of said components being a rail wherein said rail comprises first locking means integral therewith, said first locking means comprising at least two apertures formed through said rail, spaced from a periphery of said rail, wherein said apertures are of a preselected size and shape and said bracket comprises rail coupling means integral therewith for coupling said rail to said bracket and second locking means integral therewith cooperating with said first locking means for releasably locking said rail to said bracket said second locking means of said bracket comprising at least one tab of a preselected size and shape corresponding to said aperture of said rail whereby at least one tab of said bracket is insertable into and removeable from at least one aperture of said rail such that said at least one tab is frictionally engaged within said at least one aperture in a mating snap fit relationship to releasably lock said rail to said bracket.

13. A set of components according to claim 12 wherein said rail coupling means comprises slot configures for receiving therethrough said rail.

14. A set of components according to claim 13 wherein said rail comprises an aperture located near each end of said rail for releasably locking said rail at each end thereof to a bracket.

15. A set of components according to claim 14 wherein said bracket is the shape of an inverted V having two diverging legs.

16. A set of components according to claim 15 wherein said rail in cross-section is I-shaped and resiliently flexible from top to bottom of the rail and the shape of said slot of said brackets is I-shaped and sized for a close fit of said rail through said slots whereby to insert the rail into the slots, the rail is flexed from top to bottom to slide the rail over the at least one tab of the bracket until the at least one aperture of the rail is positioned adjacent the at least one tab whereupon the flexion of the rail may be released to mate the at least one tab with the at least one aperture.

17. A set of components according to claim 16 wherein said rail comprises a middle between each of said ends of the rail and a third aperture located at about the middle of said rail for releasably locking said rail to a bracket at the middle of said rail and said bracket comprises two slots on one leg thereof and one slot on the other leg thereof.

* * * * *